H. RIGBY.
LEAF SPRING.
APPLICATION FILED NOV. 30, 1917.
1,288,993.   Patented Dec. 24, 1918.
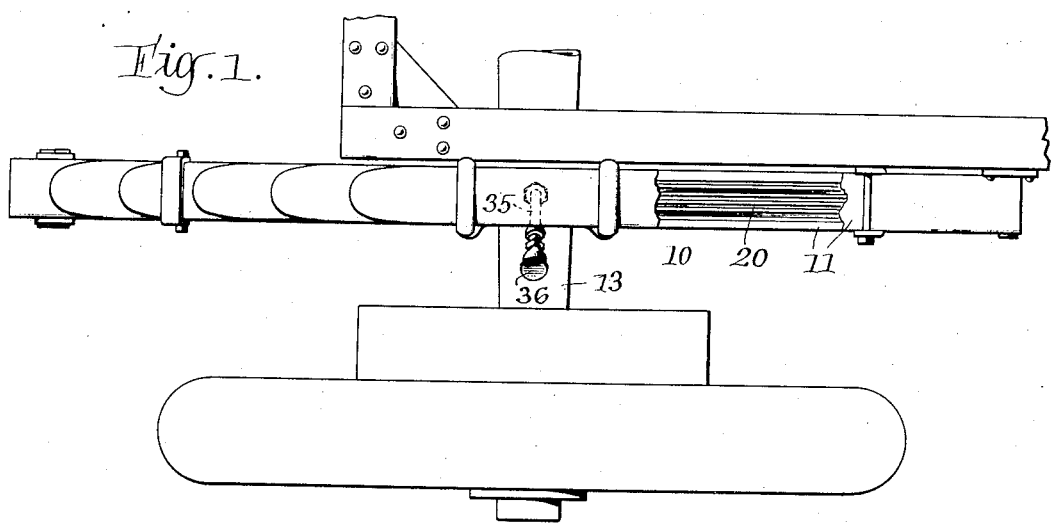
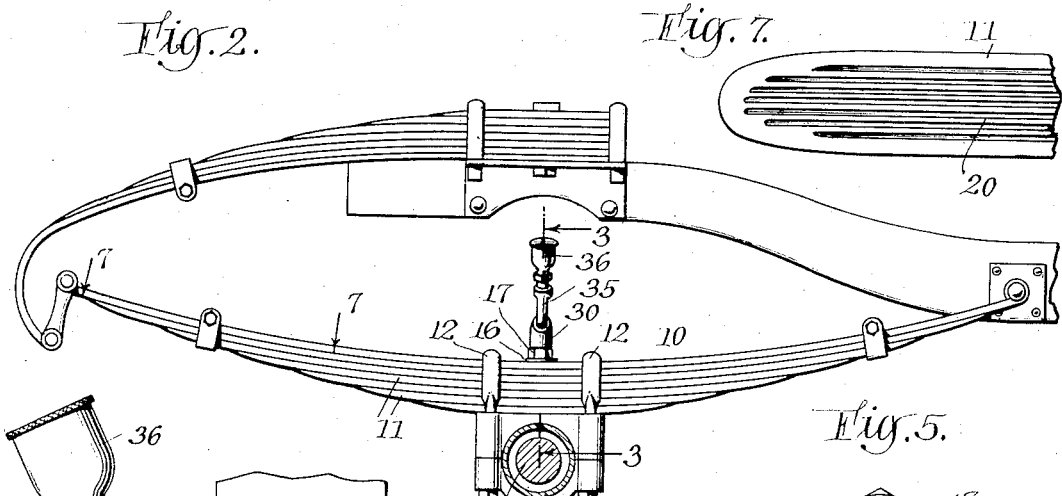
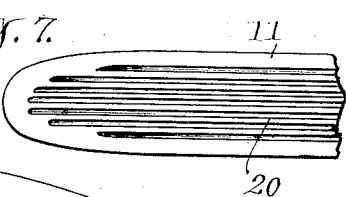
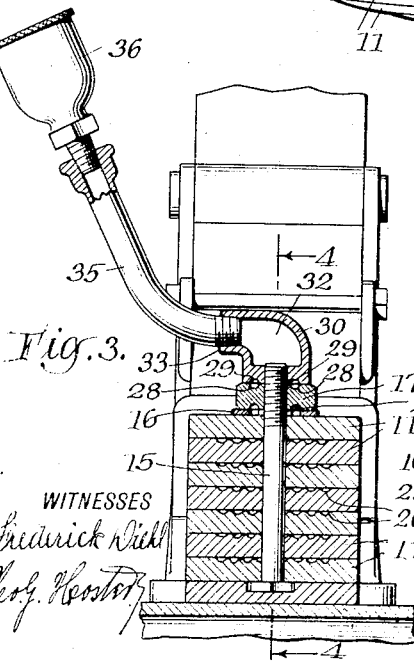
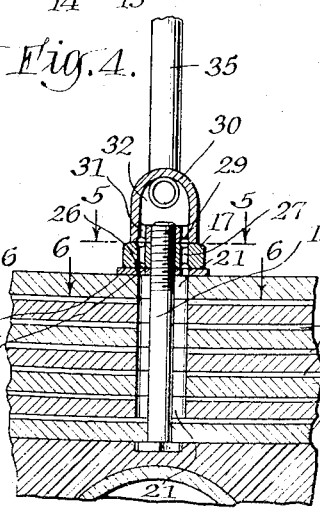
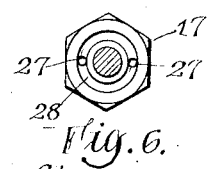
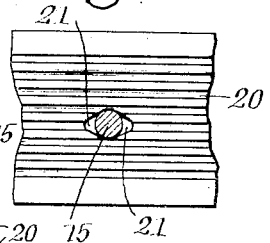
WITNESSES
INVENTOR
Holden Rigby
BY
ATTORNEYS

UNITED STATES PATENT OFFICE.

HOLDEN RIGBY, OF PATERSON, NEW JERSEY.

LEAF-SPRING.

1,288,993.

Specification of Letters Patent.   Patented Dec. 24, 1918.

Application filed November 30, 1917.   Serial No. 204,696.

*To all whom it may concern:*

Be it known that I, HOLDEN RIGBY, a citizen of the United States, and a resident of Paterson, in the county of Passaic and State of New Jersey, have invented new and useful Improvements in Leaf-Springs, of which the following is a full, clear, and exact description.

The object of the invention is to provide certain new and useful improvements in leaf springs such as are used in automobiles and other vehicles and devices whereby the leaves of the spring are automatically lubricated without requiring any attention on the part of the owner, and to reduce to a minimum the wear incident to the rubbing of the leaves one on the other. Another object is to retain the lubricant in position between the superimposed leaves of the spring thus preventing the spring from becoming dry and the leaves rusted with a consequent squeaking and breaking of the spring. A further object is to provide the stock of which the leaves are made with longitudinally extending grooves during the process of rolling the stock thereby reducing the expense in the manufacture of the leaf springs.

In order to accomplish the desired result, use is made of a plurality of superimposed leaves each having one face flat and smooth and the other face provided with longitudinally extending grooves over which extends the smooth, flat face of the next adjacent leaf, the grooves terminating near the outer ends of the leaves, and means supplying the grooves with lubricant.

A practical embodiment of the invention is represented in the accompanying drawings forming a part of this specification, in which similar characters of reference indicate corresponding parts in all the views.

Figure 1 is a plan view of a leaf spring in position on an automobile, a portion of the upper leaf being shown broken out;

Fig. 2 is a side elevation of the same with the axle and its casing shown in section;

Fig. 3 is an enlarged cross section of the same on the line 3—3 of Fig. 2;

Fig. 4 is an enlarged sectional side elevation of the same on the line 4—4 of Fig. 3;

Fig. 5 is a sectional plan view of the standard bolt and its nut for fastening the leaves together, the section being on the line 5—5 of Fig. 4; and Fig. 6 is a sectional plan view of the leaf spring on the line 6—6 of Fig. 4.

Fig. 7 is a fragmentary plan view of one of the leaves.

The improved leaf spring 10 illustrated in the drawings is in the form of a semi-elliptical spring, but it is expressly understood that I do not limit myself to this particular type of leaf spring as the improvement described in detail may be applied to quarter-elliptical leaf springs or other types of leaf springs. As shown, the superimposed leaves 11 are fastened by clips 12 to the casing 13 of the axle 14, and the leaves are connected with each other at the middle by a standard bolt 15 having a washer 16 and a nut 17, and which washer 16 rests on the top of the uppermost leaf 11.

Each of the leaves 11 is provided with a flat, smooth under surface, and each of the leaves except the top one is provided on the top with longitudinally extending grooves or channels 20 terminating near the ends of the leaf and formed therein during the process of rolling the stock of which the leaves are made by the spring manufacturer. The grooves 20 are at the middle of each leaf connected with an elongated aperture 21 formed centrally in the leaf and through which aperture extends the standard bolt 15, as plainly indicated in Figs. 3, 4 and 6. It will be noticed that the apertures 21 of the several superimposed leaf springs are in register with each other and they form oil wells on opposite sides of the bolt 15 to permit the oil in the said oil wells to readily pass to the channels or grooves 20 to be distributed practically throughout the length of the leaf spring as well as the width thereof owing to the rubbing action of the leaves one upon the other thereby causing the distribution of the lubricant between the leaves. It will also be noticed that by the arrangement described the oil is retained in the grooves and hence the spring leaves are not liable to become dry and to rust at their contacting faces.

In order to supply the oil wells formed by the registering apertures 21 with oil the following arrangement is made: The washer 16 is provided with a series of apertures 25 arranged in a circle with some of the apertures opening into the aperture 21 of the uppermost leaf 11. The washer apertures 25 register with an annular groove 26 formed in the bottom of the nut 17 and from the groove 26 extend apertures 27 leading to an annular groove 28 formed in the top of the nut 17. The annular groove 28 is in register with an annular groove 29 formed on the under side of a cap 30 screwing on the upper end of the bolt 15 and abutting against the top of the nut 17. In the annular groove 29 extend apertures 31 leading to a chamber 32 formed in the cap 30 which latter is provided at one side with a threaded boss 33 into which screws the lower end of a pipe 35 extending upwardly and outwardly in a sidewise direction, as plainly indicated in the drawings. On the upper end of the pipe 35 screws a cup 36 filled with oil or other suitable lubricant. By the arrangement described, the oil contained in the cup 36 passes by way of the pipe 35 into the cap 30 from which the oil flows by way of the registering apertures 31, 27 and 25 into the oil wells formed by the registering apertures 21 of the leaves. The oil from the oil wells passes into the grooves 20 of the leaves 11 to lubricate the contacting faces of the leaves, as previously explained. It will be noticed that by the arrangement described the oil fills the grooves or channels 20 to keep the leaves automatically lubricated at all times and thus insure proper working of the springs without producing undesirable squeaking noises.

Having thus described my invention, I claim as new and desire to secure by Letters Patent:—

1. A leaf spring, comprising a plurality of superimposed leaves, each having one face flat and smooth and the other face provided with longitudinally extending grooves over which extends the smooth flat face of the next adjacent leaf, the leaves being provided at the middle with registering elongated apertures into which lead sundry of the said grooves of each leaf, a bolt extending centrally through the registering apertures, an oil cup, a pipe secured at one end to the said oil cup, a cap on the other end of the said pipe and screwing on the said bolt, the said cap having an oil supply chamber, and connecting means held on the said bolt intermediate the oil cup and the uppermost leaf, the said means having a passage connecting the said oil supply chamber with the aperture in the uppermost leaf.

2. A leaf spring, comprising a plurality of superimposed leaves each having one face flat and smooth and the other face provided with longitudinally extending grooves over which extends the smooth flat face of the next adjacent leaf, the grooves terminating near the outer ends of the leaf, the leaves being provided at the middle with registering elongated apertures into which lead sundry of the said grooves of each leaf, a bolt extending centrally through the registering apertures, a washer held on the said bolt and resting on the upper face of the uppermost leaf, the washer having apertures in register with the aperture of the uppermost leaf, a nut screwing on the said bolt and against the washer, the nut having apertures and annular grooves at its top and bottom faces and into which the said nut apertures lead, a cap screwing on the said bolt and having its bottom fitting the top of the said nut, the bottom of the cap having apertures and an annular groove into which open the cap apertures, the cap groove registering with the top groove of the nut, a pipe connected with the said cap and extending outward and upward therefrom, and an oil cup on the upper end of the said pipe.

HOLDEN RIGBY.